United States Patent [19]

Evans et al.

[11] Patent Number: 4,581,253
[45] Date of Patent: Apr. 8, 1986

[54] PROCESS FOR PREPARING PRE-CURED PROPPANT CHARGE

[75] Inventors: John A. Evans, Aurora; James Sharp, Elburn, both of Ill.

[73] Assignee: Acme Resin Corporation, Forest Park, Ill.

[21] Appl. No.: 679,307

[22] Filed: Dec. 7, 1984

[51] Int. Cl.⁴ .................... C09K 3/00; E21B 43/267; B05D 7/00
[52] U.S. Cl. ................................... 427/221; 166/280; 252/8.55 R
[58] Field of Search .................. 252/8.55 R; 166/280; 427/221

[56] References Cited

U.S. PATENT DOCUMENTS

| | | |
|---|---|---|
| 3,492,147 | 1/1970 | Young et al. ................ 117/62.2 |
| 3,929,191 | 12/1975 | Graham et al. ................ 166/276 |
| 4,290,928 | 9/1981 | Funabiki et al. ............ 427/221 X |
| 4,439,489 | 3/1984 | Johnson et al. ............. 427/221 X |
| 4,443,347 | 4/1984 | Underdown et al. ......... 427/221 X |
| 4,494,318 | 1/1985 | Smillie .................... 427/221 X |

Primary Examiner—Michael R. Lusignan

[57] ABSTRACT

A process for preparing a proppant charge comprising individual sand particles coated with a pre-cured thermosettable resin. Sand is mixed with melted resin, and the resin-coated sand is heated under conditions which cure the resin. Mixing is carried out with sufficient mechanical shearing action to limit agglomeration of the resin-coated sand particles.

28 Claims, 2 Drawing Figures

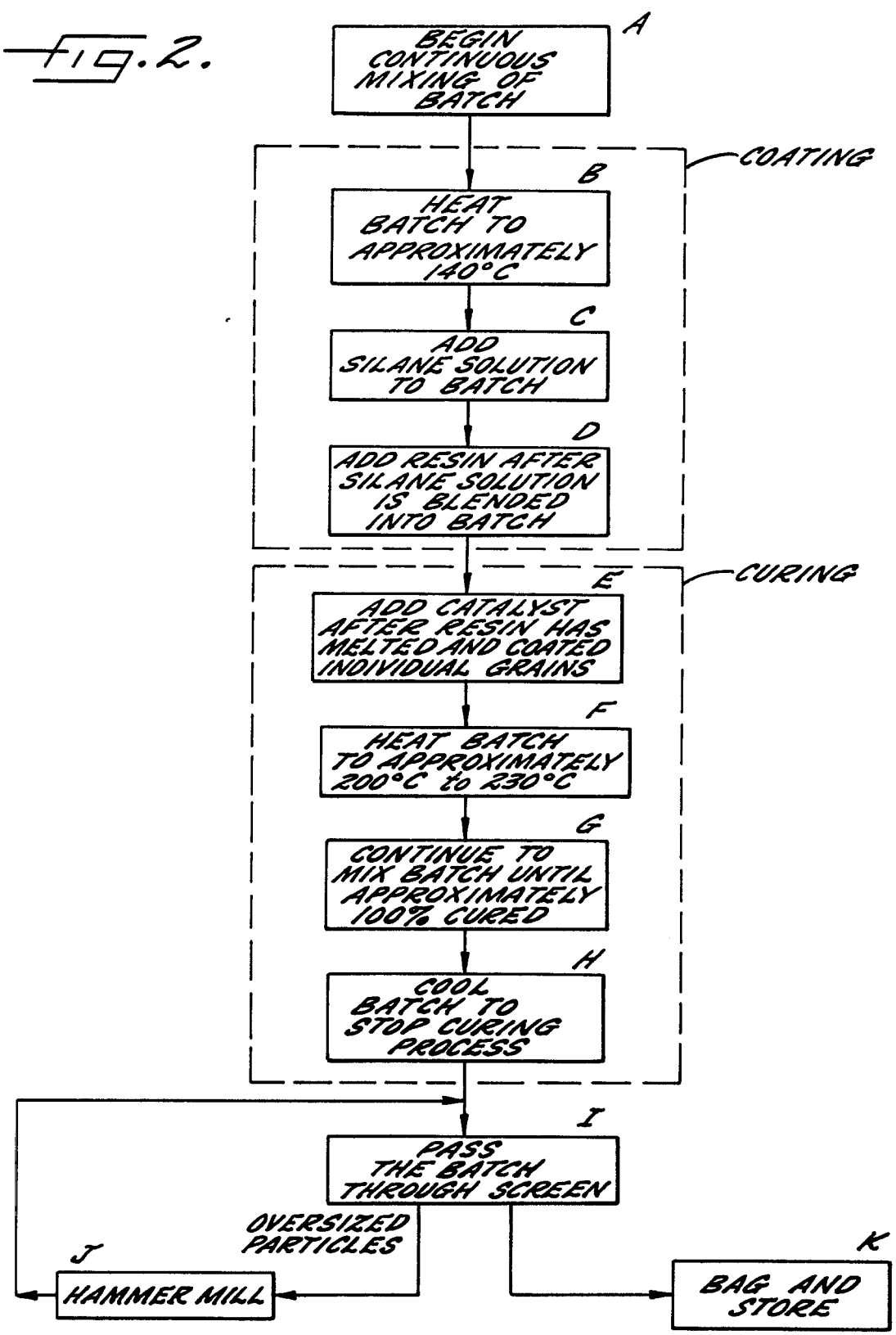

PROCESS FOR PREPARING PRE-CURED PROPPANT CHARGE

FIELD OF INVENTION

The present invention relates generally to processes for coating particulate materials such as sand with resin and, more particularly, to a process for forming a proppant comprising sand grains coated with a pre-cured thermoset resin.

BACKGROUND

Much of the technical terminology to be used herein is to be understood to have the same meaning defined in Underdown et al. U.S. Pat. No. 4,443,347, namely:

(1) The terms "percent" and "parts" refer to percent and parts by weight, unless otherwise indicated.

(2) The term "resole" refers to a resin product of the partial condensation of a phenol with an aldehyde in such proportions that the partial condensate is capable of further condensation to an infusible or thermoset condition. Resoles can be either soluble or dispersible in water if condensation is stopped at an early stage or they can be essentially water-insoluble solids most often used in powdered condition. Inherently, resoles are fusible in the sense that, when heated to a sufficiently high temperature, they soften and will resolidify upon cooling; however, resoles are capable of undergoing further condensation when heated to a temperature sufficiently high that they fuse, particularly under either acid or alkaline conditions, so that they tend to undergo change when heated to fusion. Resoles are, most often, produced by the alkaline condensation of unsubstituted phenol (hydroxy benzene) with formaldehyde. The mole ratio of formaldehyde to phenol usually ranges from about 1.1:1 to about 1.5:1. The condensation is most often carried out in the presence of a fixed alkali, for example sodium hydroxide, calcium hydroxide or barium hydroxide and at a number of different temperatures, usually all in excess of about 100° F. The chemical and physical properties of a resole can be varied within substantial limits, usually depending upon such factors as the mole ratio of aldehyde to phenol, the nature of the condensation reaction, what is done with the fixed alkali after completion of the condensation and the nature and proportion of any chemical additive that is present.

(3) The term "resite" refers to an infusible or thermoset resin material produced by the further condensation of a resole.

(4) The term "novolac" refers to the resin products of the substantially complete condensation of a phenol with an aldehyde in such proportions that condensation is not capable of proceeding to form an infusible product. Novolacs are usually produced by the condensation of unsubstituted phenol with formaldehyde in approximately equimolecular proportions, often with a slight excess of phenol. A novolac is fusible and, since it does not contain a sufficiently high proportion of formaldehyde to enable condensation to a thermoset condition, it can be heated to fusion and then resolidified repeatedly without undergoing chemical change. A novolac can be mixed with hexamethylenetetramine, or another formaldehyde donor, e.g., paraformaldehyde or a resole, and the mixture can then be condensed to a thermoset, or infusible, condition.

(5) "Conductivity" is the permeability of a proppant in Darcies or other suitable units multiplied by the fracture width measured in feet or other suitable units.

(6) The phrase "closure stress" refers to a pressure, read in pounds per square inch, applied to a given surface.

(7) "Sand" is a natural material, generally comprising quartz.

(8) The phrases "pre-cured" and "pre-cured proppant charge" refer to particles which have been substantially coated with a resin and the resin thereon cured to completion prior to introduction of the charge into a subterranean well.

It has been discovered that pre-cured resin-coated sand particles are extremely useful as proppants in oil wells, gas wells, water wells and other similar bore holes. These proppants provide particularly good performance at high closure stresses, e.g., from 6,000 to about 10,000 psi. Sand particles coated with cured phenolformaldehyde resin have proven particularly useful at these high closure stresses.

One method of preparing pre-cured proppant charges is disclosed in the commonly assigned Smillie U.S. Pat. No. 4,494,318. In the method described in that application, a single layer of uncured resin-coated particles is fed to a heated rotating surface. As the resin-coated particles are carried on the rotating surface, they are cured by the heat of the surface. The cured resin-coated particles are removed from the rotating surface by a scraper blade which contacts the rotating surface at a predetermined angle of surface rotation.

Other methods of preparing pre-cured proppant charges are described in the aforementioned Underdown U.S. Pat. No. 4,443,347 and in Johnson et al. U.S. Pat. No. 4,439,489.

SUMMARY OF THE INVENTION

It is a primary object of the present invention to provide an improved process for controllably coating sand or other particulate material, with a cured thermoset resin. In this connection, one specific object of the invention is to provide such a process which produces pre-cured proppant charges at high production rates.

A further object of the invention is to provide a process which is capable of producing a high volume of cured resin-coated proppant at a cost per unit weight which is competitive with other available proppants.

Another object of the invention to provide such a process which is capable of producing cured resin-coated particles which have a low level of cross-binding between particles, and a correspondingly low level of agglomerates.

Still another object of invention is to provide such an improved process which produces pre-cured proppant charges having a high crush strength and high conductivity.

Other objects and advantages of the inventions will be apparent from the following detailed description.

In accordance with the present invention, the foregoing objectives are realized by a process comprising the steps of coating individual sand particles with thermosettable resin by mixing the sand and resin at a temperature sufficient to melt the resin; curing the resin coating on the sand particles by heating the resin-coated sand at a temperature, and for a time, sufficient to cure the resin while continuing the mixing, the mixing of sand and resin during both the coating step and the curing step being carried out with intensive mechanical shearing action sufficient to limit agglomeration of the resin-coated sand particles; and cooling the resulting cured resin coating on the sand to prevent over-curing. The mechanical shearing action is preferably sufficient to limit agglomeration of the resin-coated sand particles to less than about 5% by weight. In one embodiment of the invention, the mechanical shearing action is effected by a multiblade rotor driven at a peripheral surface velocity of at least 100 feet per minute.

BRIEF DESCRIPTION OF THE DRAWINGS

FIG. 2 is a flowchart of one example of the process of the invention.

Figure 1:
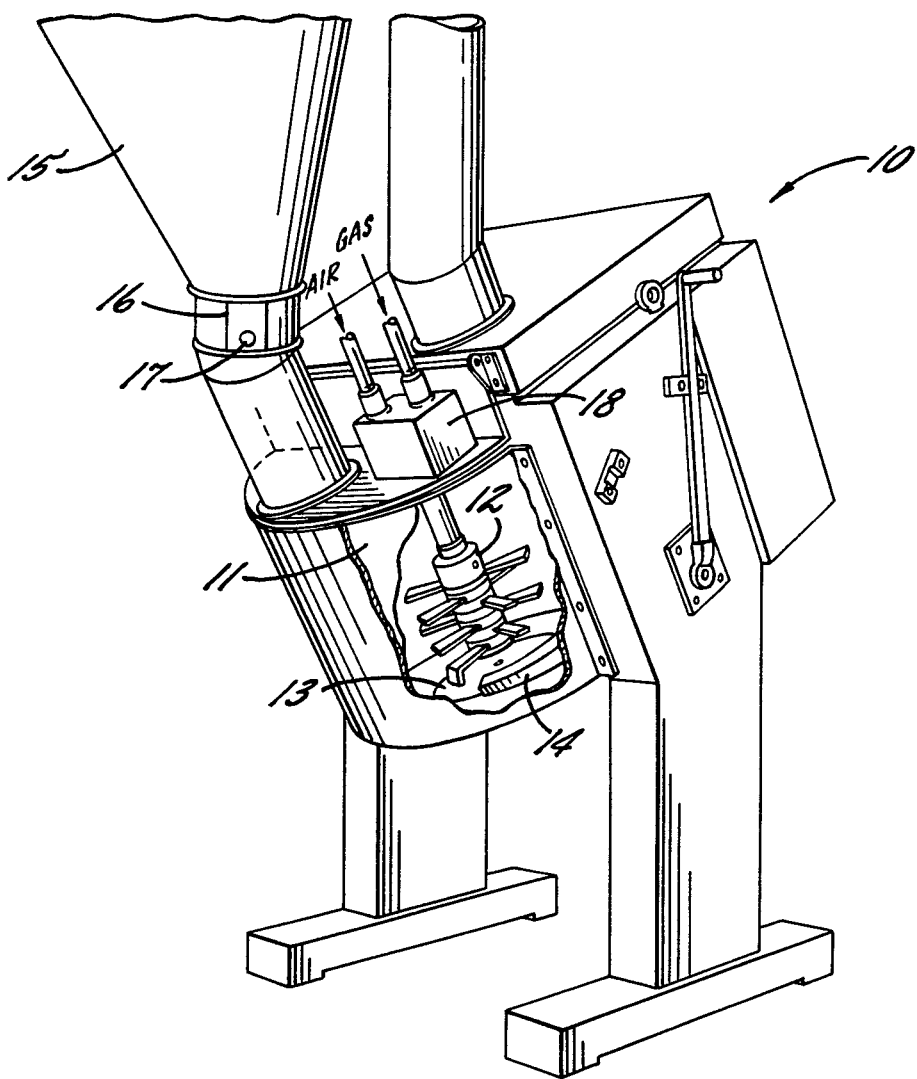
FIG. 1 is a perspective view of a commercially available mixer suitable for use in carrying out the process of this invention.

Although the invention will be described in connection with certain preferred embodiments, it will be understood that it is not intended to limit the invention to these particular embodiments. On the contrary, it is intended to cover all alternatives, modifications, and equivalents that may be included within the spirit and scope of the invention as defined by the appended claims. For example, although sand particles are preferably used in connection with the invention, other suitable particulate materials may be substituted for the sand. Other materials suitable for use as proppants, and therefore possible substitutes, include sintered bauxite, zircon and glass.

DESCRIPTION OF THE PREFERRED EMBODIMENT

Turning now to the drawings and referring first to FIG. 1, there is illustrated a commercially available mixer 10 suitable for use in carrying out the process of this invention. Specific examples of the illustrative mixer are the Eirich Intensive Mixers, models R7 and R11/RV11, manufactured by Eirich Machines, Inc., New York, N.Y. 10022. The mixer 10 includes a mixing chamber formed by a cylinder 11 whose axis is inclined at about 30° from vertical. Within the cylinder 11, a rotor 12 rotates about an axis which is parallel to but offset from the axis of the cylinder 11. The lower end of the rotor 12 terminates slightly above a rotatable pan 13 which forms the bottom wall of the mixing chamber. A stationary scraper blade 14 is mounted just above the top surface of the pan 13.

The sand or other particulate matter to be loaded into the mixer 11 is first introduced into a hopper 15 (FIG. 1). The size of the batch of particulate material to be loaded can be controlled by a load cell 16 or other appropriate weighing mechanism attached to the hopper 15. The loading of the sand from the hopper 15 into the mixer cylinder 11 is controlled by a valve 17 at the base of the hopper; this valve must be opened to allow sand to flow into the cylinder 11 from the hopper 15.

The illustrative mixer may be used for both the coating and curing stages of preparing a pre-cured proppant charge. In the coating stage, the sand is mixed with a thermosettable resin at a temperature sufficient to melt the resin so that it coats the individual sand particles. In the curing stage, the resin coating on the sand particles is heated at a temperature, and for a time, sufficient to cure the resin. The cured resin-coated sand particles are then cooled to prevent any over-curing.

The amount of resin used is generally within the range of about 1% to about 10% resin based on the weight of the sand, and the preferred range is usually from about 2% to about 6%.

In accordance with an important aspect of the present invention, the mixing of the sand and resin during both the coating and curing stages is carried out with a mechanical shearing action sufficient to limit agglomeration of the resin-coated sand particles to less than about 5% by weight. In the illustrative mixer, this mechanical shearing action is provided by the combined rotational movements of the multi-blade rotor 12 and the bottom pan 13. The shearing action is further enhanced by the geometric relationship of the rotor axis, which is inclined at an angle of 30° from vertical, and the plane of the bottom pan 13, which is inclined at an angle of 30° from horizontal. This geometric relationship causes the sand-resin mix to be agitated in both vertical and horizontal directions, because the forces exerted on the mixture by the rotational movements of the inclined pan and rotor have both horizontal and vertical vectors.

In keeping with the invention, the rotor 12 and the pan 13 are driven at rotational and surface velocities which subject the sand-resin mixture to intensive shearing action. More specifically, the peripheral surface velocity of the rotor relative to the sand is preferably at least 100 feet per minute. For example, in a working example which will be described in more detail below, a rotor having a diameter of 350 millimeters is driven at a rotational speed of 435 rpm, producing a peripheral surface velocity of about 8 meters per second. In general, it is preferred that the rotor have a surface velocity of at least about 6 meters per second. In this same example, the pan has a diameter of about 4 feet and is driven at a rotational speed of 44 rpm, thereby producing a peripheral surface velocity in excess of 9 feet per minute. These dimensions and velocities subject the resin-sand mixture to high shear forces, thereby producing a high degree of inter-particle motion throughout the mixing chamber which virtually eliminates any inter-particle bonding (agglomeration). As mentioned previously, the shearing action is further enhanced by the inclined geometry of the rotor and the pan.

Referring now to the flowchart in FIG. 2 for a more detailed description of an exemplary embodiment of the invention, a batch of washed silica sand is loaded into the hopper 15. When the weight of the batch, as measured by the load cell 16, reaches a predetermined weight (e.g., 100 lbs. for the Eirich model R7), the valve 17 is opened to transfer the sand from the hopper 15 into the cylinder 11. The rotor 12 and the pan 13 are then activated to begin rotation (step A in FIG. 2), and the burner unit 18 is ignited to being pre-heating of the sand (step B in FIG. 2). As will be apparent from the ensuing description, the rotor 12 and pan 13 continue rotating throughout the process whereas the burner unit 18 is turned off after pre-heating the sand and then later reignited.

After the sand has been pre-heated to approximately 140° C. in step B, the burner unit 18 is turned off. Because of the inherent time delay in the propagation of heat throughout the sand in the mixer, the temperature of the sand continues to rise to a peak temperature of approximately 150°–155° C. after the burner unit 18 has been turned off. When the sand reaches its peak temperature, a silane/water solution is added to the sand (step C) to clean the individual sand particles and provide a base coating on the particles which aids the subsequent bonding of resin thereto. The silane is preferably diluted with about an equal weight of water. One example of a suitable silane is silane number A1100 manufactured by Union Carbide Corporation of Birmingham, Mich.

When the silane solution is added to the sand at step C, the temperature of the sand must be low enough (i.e., below approximately 155° C.) to avoid vaporizing the solution when it contacts the hot sand particles. If the sand is heated to a temperature in excess of 155° C., the silane addition can be omitted.

Following the addition of the silane-water solution, and before the temperature of the sand has dropped below about 130° C., a two-step phenolic resin is added to the sand (step D in FIG. 2). One example of a suitable phenol-formaldehyde novolac resin is resin number 40 TA 15 manufactured by Georgia Pacific Corporation of Atlanta, Ga.; this product contains six percent by weight calcium stearate. The resin must be added and mixed into the sand while the sand is at a temperature high enough to ensure that the resin is melted and adequately distributed throughout the sand to coat all the individual particles. The sand and resin must be mixed long enough to completely coat every sand grain with the melted resin, which typically requires about 60 seconds with the exemplary resin and temperature mentioned above.

Additional calcium stearate (or other suitable lubricant) may be added to the resin-coated sand after the resin has been melted and thoroughly mixed into the sand so as to coat each individual sand grain. This step is optional because it is generally preferred to mix the entire amount of calcium stearate with the resin prior to the introduction of the resin into the sand.

After the resin has been thoroughly mixed with the sand, coating each individual sand particle, the curing stage is initiated by adding a catalyst or curing agent to the mixer (step E in FIG. 2). When the resin is a phenol-formaldehyde novolac resin, the preferred catalyst is hexamethylenetetramine, which can be added in an aqueous solution.

After the catalyst is added, it is important that the temperature of the sand not drop below the stick point temperature of the resin, which is approximately 82° C. for the 40 TA 15 resin composition manufactured by Georgia Pacific ("stick point" is well known in the foundry art and is measured by the procedure described in Dieters, *Foundry Care Practice*, 3rd ed., 1966, p. 227, published by American Foundrymen's Society). If the temperature of the resin-coated sand is allowed to drop below the stick point as the resin is curing, it is difficult for the mechanical shearing action to overcome the tendency of the coated particles to cross-bind and agglomerate. In fact, stopping the mixer only momentarily (e.g., 10 seconds) at a temperature below the stick point of the resin will allow sufficient cross-binding to occur so as to agglomerate the sand to a degree that prevents the re-starting of the mixer.

Thus, shortly after the hexamethylenetetramine is added and mixed into the resin-coated sand, the heater unit 18 is re-ignited to bring the sand up to a temperature of approximately 205° C. (step F in FIG. 2). By re-heating the resin-coated sand before the temperature has dropped to the stick point of the resin, and by keeping the temperature of the sand above the stick point of the curing resin while continuing the mechanical shearing action, the intensive mechanical shearing action is able to virtually eliminate cross-binding during the curing stage.

Since the catalyst (e.g., hexamethylenetetramine) is in an aqueous solution and at room temperature, adding the catalyst to the resin-coated sand has a cooling effect on the resin and sand. However, the burner unit 18 is re-ignited soon enough after the addition of the catalyst to prevent the temperature of the resin from falling to the stick point.

The degree and rate of curing of the resin are controlled by the temperature to which the resin is heated and the time the resin is maintained at temperature levels above the stick point. Curing typically requires two to four minutes, with the burner unit remaining ignited during that entire interval. The resin-coated sand reaches a peak temperature of 200° to 230° C. under these conditions. As mentioned, the mechanical shearing action is continued throughout the process.

In the exemplary process illustrated in FIG. 2, the burner unit 18 is turned off when the temperature of the coated sand reaches approximately 220° C.; as already indicated, this typically requires about two to four minutes in the particular mixer mentioned above. After the burner unit is turned off, the resin-coated sand is cooled by adding water to the mixer (step H). The mixture of water and resin-coated sand s allowed to dwell in the mixer for about 10 to 30 seconds, with the rotor and pan still being driven. At the end of this cooling interval, the discharge opening 18 at the bottom of the mixer cylinder 11 is opened, thereby allowing the cured resin-coated particles to be emptied from the mixer 11.

The resin coating on the sand is preferably cured sufficiently to produce maximum crush strength at a closure stress of 10,000 to 12,000 psi. Though the absolute maximum crush strength is not always attainable in actual practice, it is generally preferred to have less than 1% crush at 12,000 psi (where "crush" is defined as passing a 40 mesh screen, U.S. Standard Screen size). If the resin is overly cured, the additional curing will cause the resin coating to deteriorate in strength and become brittle, thereby reducing the crush strength of the proppant. Typically, the desired degree of curing is determined by a simple visual inspection of the color of the resin coating on the sand. When properly cured, but not overly cured, the resin 40 TA 15 has a golden brown color.

After the coated sand has been discharged from the mixer, it is passed through a screen (step I in FIG. 2) to remove agglomerates that cannot pass a 16 mesh screen, U.S. Standard Screen size. These agglomerates are routed to a hammermill (step J), where the cross-bound particles are separated and then returned to the screen. Those particles which are within an acceptable size limit (i.e., which pass 16 mesh screen) are routed to conventional bagging and storing apparatus (step K).

EXAMPLES

A series of thirteen test runs were carried out in an Eirich Model R7 mixer. The particular rotor employed in the mixer was a "star" rotor, as shown in FIG. 1, having a diameter of 350 mm. The rotor was rotated in a clockwise direction (as referenced from the top of the mixer) at a speed of 435 rpm, while the pan was rotated in the same direction at 44 rpm. The sand was washed virgin silica sand (loose bulk density 1.61 kg/cm$^3$) obtained from Martin Marietta Corp. of Rolling Meadows, Ill. Each test run processed a batch of sand weighing approximately 100 pounds.

Each test run used 3.7 pounds of number 40 T 15 phenol formaldehyde novolac resin manufactured by Georgia Pacific Corporation of Atlanta, Ga. This resin has a stick point of approximately 82° C. A 70-milliliter volume of an aqueous silane solution (50% by weight silane) was used in each test run; 35 milliliters was silane number A1100 manufactured by Union Carbide Corporation, and 35 milliliters was distilled water. Calcium stearate in the amount of 0.074 pounds was added to each batch. For the catalyst, 0.26 pound of hexamethylenetetramine was dissolved in 500 milliliters of distilled water.

The conditions used in these thirteen test runs are set forth in the table on the following pages.

|  | Run No. | | | | | |
|---|---|---|---|---|---|---|
|  | 1 | | 2 | | 3 | |
|  | elapsed time min:sec | °C. | elapsed time min:sec | °C. | elapsed time min:sec | °C. |
| A. COATING | | | | | | |
| 1. Burner "On" | 0:00 | 62 | 0:00 | 44 | 0:00 | 55 |
| 2. Burner "Off" | 1:10 | 140 | 1:13 | 140 | 1:06 | 140 |
| 3. Peak Temp. | N/T | N/T | N/T | N/T | N/T | N/T |
| 4. Add Silane Solution | 1:18 | 150 | 1:20 | 150 | 1:13 | 154 |
| 5. Add Resin Flakes | 1:43 | 132 | 2:13 | 143 | 2:04 | 143 |
| B. CURING | | | | | | |
| 6. Add Calcium Stearate | 2:43 | 109 | 3:13 | 119 | 3:04 | N/T |
| 7. Add Hexa | 3:00 | 101 | 3:24 | 118 | 3:14 | N/T |
|  | 3:15 | 88 | 3:41 | 100 | 3:26 | 105 |
| 8. Burner "On" | 3:33 | N/T | N/T | N/T | 4:00 | N/T |
| 9. Burner "Off" Add Cooling Water | 7:05 | 220 | 5:57 | 220 | 5:36 | 220 |
| 10. Peak Temp. | N/T | N/T | N/T | N/T | N/T | 224 |
| 11. Discharge Time | 7:22 | 222 | 6:15 | 218 | 5:55 | 214 |

|  | Run No. | | | | | |
|---|---|---|---|---|---|---|
|  | 4 | | 5 | | 6 | |
|  | elapsed time min:sec | °C. | elapsed time min:sec | °C. | elapsed time min:sec | °C. |
| A. COATING | | | | | | |
| 1. Burner "On" | 0:00 | 41 | 0:00 | 41 | 0:00 | 32 |
| 2. Burner "Off" | 1:18 | 140 | 1:16 | 140 | 1:18 | 140 |
| 3. Peak Temp. | N/T | N/T | N/T | N/T | N/T | N/T |
| 4. Add Silane Solution | 1:28 | 155 | 1:30 | 153 | 1:53 | 150 |
| 5. Add Resin Flakes Melt and Coat | 2:23 | 143 | 2:15 | 143 | 2:03 | 143 |
| B. CURING | | | | | | |
| 6. Add Calcium Stearate Powder | N/A | N/A | N/A | N/A | N/A | N/A |
| 7. Add Hexa | 3:23 | 120 | 3:15 | 214 | 3:03 | 115 |
|  | 3:42 | 98 | | | | |
| 8. Burner "On" | N/T | N/T | 3:30 | 107 | 3:20 | 95 |
| 9. Burner "Off" | 5:55 | 220 | 5:23 | 220 | 5:21 | 220 |
| 10. Add Cooling Water | N/A | N/A | N/A | N/A | N/A | N/A |
| 11. Peak Temp. | N/T | 222 | 5:30 | 225 | 5:31 | 226 |
| 12. Discharge Time | 6:25 | 211 | 5:55 | 220 | 5:50 | 220 |

|  | Run No. | | | | | |
|---|---|---|---|---|---|---|
|  | 7 | | 8 | | 9 | |
|  | elapsed time min:sec | °C. | elapsed time min:sec | °C. | elapsed time min:sec | °C. |
| A. COATING | | | | | | |
| 1. Burner "On" | 0:00 | 60 | 0:00 | 43 | 0:00 | 53 |
| 2. Burner "Off" | 1:17 | 140 | 1:14 | 140 | 1:15 | 140 |
| 3. Peak Temp. | 1:41 | 158 | N/T | 154 | 1:40 | 158 |
| 4. Add Silane Solution | 1:59 | 143 | 1:23 | 150 | 2:02 | 150 |
| 5. Add Resin Flakes Melt and Coat | 2:12 | 141 | 1:58 | 143 | 2:16 | 143 |
| B. CURING | | | | | | |
| 6. Add Calcium Stearate Powder | N/A | N/A | 2:58 | 119 | 3:16 | 119 |
| 7. Add Hexa | 3:12 | 117 | 2:58 | 119 | 3:33 | 118 |
|  | 3:27 | 107 | 3:10 | 110 | 3:43 | 107 |
| 8. Burner "On" | 3:33 | 97 | 3:17 | — | 3:51 | 99 |
| 9. Burner "Off" | 5:24 | 220 | 5:16 | 220 | 5:45 | 220 |
| 10. Add Cooling Water | N/A | N/A | N/A | N/A | N/A | N/A |
| 11. Peak Temp. | 5:33 | 226 | 5:23 | 227 | 5:53 | 226 |
| 12. Discharge Time | 5:49 | 220 | 5:33 | 220 | 6:00 | 220 |

|  | Run No. | | | | | |
|---|---|---|---|---|---|---|
|  | 10 | | 11 | | 12 | |
|  | elapsed time min:sec | °C. | elapsed time min:sec | °C. | elapsed time min:sec | °C. |
| A. COATING | | | | | | |
| 1. Burner "On" | 0:00 | 43 | 0:00 | 43 | 0:00 | 42 |
| 2. Burner "Off" | 1:13 | 140 | 2:15 | 210 | 2:11 | 210 |
| 3. Peak Temp. | 1:30 | 153 | 2:38 | 218 | 2:25 | 220 |
| 4. Add Silane Solution | 1:45 | 148 | N/A | N/A | N/A | N/A |
| 5. Add Resin Flakes Melt and Coat | 2:04 | 143 | 2:47 | 212 | 2:42 | 212 |
| B. CURING | | | | | | |
| 6. Add Calcium Stearate Powder | 3:04 | 122 | 3:17 | 177 | 3:12 | 196 |
| 7. Add Hexa | 3:15 | 121 | 3:17 | 177 | 3:12 | 196 |
|  | 3:30 | 110 | 3:45 | 163 | | |
| 8. Burner "On" | 3:37 | 100 | N/A | N/A | 3:50 | 155 |
| 9. Burner "Off" | 5:33 | 220 | N/A | N/A | 4:40 | 180 |
| 10. Add Cooling Water | N/A | N/A | N/A | N/A | 4:54 | 183 |
| 11. Peak Temp. | 5:40 | 224 | N/A | N/A | N/A | N/A |
| 12. Discharge Time | 5:50 | 220 | 6:20 | 116 | 5:45 | 112 |

|  | Run No. | |
|---|---|---|
|  | 13 | |
|  | elapsed time min:sec | °C. |
| A. COATING | | |
| 1. Burner "On" | 0 | 37 |
| 2. Burner "Off" | 3:40 | 288 |
| 3. Peak Temp. | 4:00 | 295 |
| 4. Add Silane Solution | N/A | N/A |
| 5. Add Resin Flakes Melt and Coat | 4:24 | 288 |
| B. CURING | | |
| 6. Add Calcium Stearate Powder | 4:54 | 224 |
| 7. Add Hexa | 5:00 | 220 |
|  | 5:15 | 211 |
| 8. Burner "On" | N/A | N/A |
| 9. Burner "Off" | N/A | N/A |
| 10. Add Cooling Water | 6:30 | 180 |
| 11. Peak Temp. | N/A | N/A |
| 12. Discharge Time | 7:00 | 159 |

The entry "N/A" in the above table means "not applicable;" e.g., in runs Nos. 4 and 5 no calcium stearate was added at step 6. In runs Nos. 6 and 7 the calcium stearate was pre-mixed with the resin flakes. Though not indicated in the table, an additional 34 grams of calcium stearate was added during the curing stage in runs Nos. 8 and 9, and an additional 68 grams of calcium stearate was added during the curing stage in run No. 10. In runs Nos. 1–11 the "hexa" was added as an aqueous solution, and in runs Nos. 12 and 13 the "hexa" was added as a paste (118 grams powdered hexa in 50 ml water in No. 12, and 118 grams granular hexa in 50 ml water in No. 13). In run No. 12, all the cooling water had evaporated by the end of the "dwell" period, and the sand showed some condensation after it was discharged onto the cooling trays.

In order to test the products of the thirteen runs for agglomerates, the product of each run was dumped onto a No. 16 sieve. Material that remained on the sieve, i.e., the material larger than 16 mesh, consisted of two or more sand particles bound together. The percentages of these agglomerates was consistently below 5%, and was typically between 1.5 and 2.0% by weight of the total product of each run.

To test for crush strength, the material that passed the No. 16 sieve was tested by the American Petroleum Institute RP.56 procedure for testing frac sand. In this procedure a portion of each sample is screened through appropriate sieves to determine what percentage of the sample passes a 40-mesh screen. 40 grams of the remainder of the sample is then placed inside a cylindrical test cell having a 2" inside diameter. A load is applied hydraulically to the material in the cylinder for a period of one minute, at a rate and magnitude to increase the pressure on the sample to 4000 psi. This pressure is maintained for a period of two minutes, at which time the load is reduced to zero and the sample removed. The material is then removed from the cell and screened to determine what percentage passes a 40-mesh screen. This test was carried out on three samples of the product from each run, and the results obtained with the three samples were then averaged. The results obtained for the thirteen runs described above were as follows:

| Run No. | % 40 Mesh Before Crush | % 40 Mesh After Crush | Net Increase |
|---|---|---|---|
| 1 | 4.43 | 9.43 | 5.0 |
| 2 | 4.0 | 8.67 | 4.67 |
| 3 | 3.87 | 8.13 | 4.26 |
| 4 | 5.4 | 11.03 | 5.63 |
| 5 | 4.7 | 9.95 | 5.25 |
| 6 | 3.47 | 7.86 | 4.39 |
| 7 | 4.43 | 9.7 | 5.27 |
| 8 | 4.8 | 8.26 | 3.46 |
| 9 | 6.4 | 9.03 | 2.63 |
| 10 | 5.16 | 8.46 | 3.29 |
| 11 | 8.67 | 19.6 | 10.93 |
| 12 | 3.87 | 8.5 | 4.63 |
| 13 | 7.43 | 12.57 | 5.14 |

Run No. 11 did not produce satisfactory crash strength because the resin was not sufficiently cured, due to the relatively low temperature of the resin-coated sand during the curing stage. In Run No. 13, a relatively high percentage of the product passed the 40-mesh screen both before and after crush test, indicating stress cracking of the resin due to the relatively high temperature used in the coating stage.

The pre-cured proppant charges prepared in test runs Nos. 2, 4 and 6 were also tested for permeability (fracture conductivity) at closure stresses ranging from 2000 to 10,000 psig (in 2000-psig increments) at a concentration of 0.25 inch initial width. The test procedure was similar to that described in "Conductivity of Fracture Proppants in Multiple Layers," Cooke, Jr. et al., *Journal of Petroleum Technology*, September, 1973, pages 1101–1107. These tests were carried out at room temperature. Three percent KCl was used as the saturating fluid and the flow cell lines were purged with carbon dioxide before introduction of the brine. To de-gas the system, a vacuum was drawn on the flow lines and the cell containing the sample. After introduction of the brine, the back pressure was stabilized and maintained at 300 psig for the duration of the test to ensure complete saturation of the flow system with brine. The desired closure stresses were produced by a 50-ton hydraulic press. The pressure drop across the test cell, and the flow of brine through the proppant pack was measured at each closure stress. Permeability of the proppant pack was calculated using the standard Darcy equation. The results were as follows:

| Sample | Closure Stress (psig) | Darcies | Darcy-Feet |
|---|---|---|---|
| #2 | 2000 | 279 | 5.391 |
|  | 4000 | 217 | 4.078 |
|  | 6000 | 174 | 3.068 |
|  | 8000 | 137 | 2.379 |
|  | 10000 | 107 | 1.758 |
| #4 | 2000 | 256 | 4.836 |
|  | 4000 | 196 | 3.664 |
|  | 6000 | 167 | 2.961 |
|  | 8000 | 143 | 2.488 |
|  | 10000 | 111 | 1.938 |
| #6 | 2000 | 237 | 4.422 |
|  | 4000 | 190 | 3.501 |
|  | 6000 | 155 | 2.784 |
|  | 8000 | 138 | 2.492 |
|  | 10000 | 111 | 1.986 |

As can be seen from the foregoing detailed description, this invention provides an improved process for controllably coating sand or other particulate material with a cured thermoset resin, thereby enabling the production of pre-cured proppant charges at high production rates. This process is capable of producing a high volume of cured resin-coated proppant at a cost per unit weight which is competitive with other available proppants capable of withstanding the same levels of pressure. The cured resin-coated particles produced by this process have a low level of cross-binding between particles, and a correspondingly low level of agglomerates. The product also has high press strength and high conductivity, as can be seen from the foregoing examples.

We claim as our invention:

1. A process for preparing a pre-cured proppant charge comprising the steps of coating individual sand particles with a thermosettable resin by mixing the sand and resin at a temperature sufficient to melt said resin, curing the resin coating on the sand particles by heating the resin-coated sand at a temperature, and for a time, sufficient to cure the resin while continuing said mixing, the mixing of sand and resin during both the coating step and the curing step being carried out with a mechanical shearing action sufficient to limit agglomeration of the resin-coated sand particles to less than about 5% by weight, and cooling the resulting cured resin coating on the sand to prevent over-curing.

2. A process as set forth in claim 1 wherein the mixture of sand and resin contains from about one to about ten percent resin based on the weight of the sand mixed therewith.

3. A process as set forth in claim 1 wherein the sand and resin are mixed with a multi-blade rotor driven at a peripheral surface velocity of at least about six meters per second.

4. A process as set forth in claim 3 wherein the rotational axis of said rotor is inclined at an angle of at least 10° from vertical.

5. A process as set forth in claim 1 wherein said rotor is driven at a rotational speed of at least 100 rpm.

6. A process as set forth in claim 1 wherein the mixing of said sand and resin is carried out in a mixing chamber having a rotatable pan which supports at least a portion of the sand and resin in the mixing chamber, and a rotor disposed within said mixing chamber and having a diameter less than half the diameter of said bottom surface, said rotor and said pan both being driven during said mixing to subject the sand and resin to said mechanical shearing action.

7. A method as set forth in claim 6 wherein said pan is inclined at an angle of at least 10° from horizontal.

8. A method as set forth in claim 1 wherein the sand is heated prior to the addition of the resin, the temperature of the sand-resin mixture is allowed to decrease during the coating of the sand particles with the resin, and then the coated sand is re-heated during the curing of the resin coating.

9. A method is set forth in claim 1 wherein a lubricant is added to the sand along with said resin.

10. A method as set forth in claim 9 wherein said lubricant is calcium stearate.

11. A method as set forth in claim 1 wherein said resin is a phenol formaldehyde resin.

12. A method as set forth in claim 1 wherein said resin coating on said sand particles is cured to an extent that produces the maximum crush strength for the cured resin-coated sand.

13. A method as set forth in claim 12 wherein said crush strength is measured at a pressure of about 12,000 psi.

14. A method as set forth in claim 1 wherein said resin coating on said sand particles is cured to an extent that produces a Conductivity Ratio greater than that of the uncoated sand particles at closure stresses in excess of about 7000 psi.

15. A process for preparing a pre-cured proppant charge comprising the steps of coating individual sand particles with a thermosettable resin by mixing the sand and resin at a temperature sufficient to melt said resin, curing the resin coating on the sand particles by heating the resin-coated sand at a temperature, and for a time, sufficient to cure the resin while continuing said mixing, mixing said sand and resin during both the coating step and the curing step with a multi-blade rotor driven at a peripheral surface velocity of at least about six meters per second so as to subject the resin-coated sand particles to intensive mechanical shearing action, and cooling the resulting cured resin coating on the sand to prevent over-curing.

16. A process as set forth in claim 15 wherein the mixture of sand and resin contains from about one to about six percent resin based on the weight of the sand mixed therewith.

17. A process as set forth in claim 15 wherein the rotational axis of said rotor is inclined at an angle of at least 10° from vertical.

18. A process as set forth in claim 15 wherein said rotor is driven at a rotational speed of at least 100 rpm.

19. A process as set forth in claim 15 wherein the mixing of said sand and resin is carried out in a mixing chamber having a rotatable pan which supports at least a portion of the sand and resin in the mixing chamber, and said rotor is disposed within said mixing chamber and has a diameter less than half the diameter of said bottom surface, said rotor and said pan both being driven during said mixing to subject the sand and resin to said mechanical shearing action.

20. A method as set forth in claim 19 wherein said pan is inclined at an angle of at least 10° from horizontal.

21. A method as set forth in claim 15 wherein the sand is heated prior to the addition of the resin, the temperature of the sand-resin mixture is allowed to decrease during the coating of the sand particles with the resin, and then the coated sand is re-heated during the curing of the resin coating.

22. A method is set forth in claim 15 wherein a lubricant is added to the sand along with said resin.

23. A method as set forth in claim 22 wherein said lubricant is calcium stearate.

24. A method as set forth in claim 15 wherein said resin is a phenol formaldehyde resin.

25. A method as set forth in claim 15 wherein said resin coating on said sand particles is cured to an extent that produces the maximum crush strength for the cured resin-coated sand.

26. A method as set forth in claim 25 wherein said crush strength is measured at a pressure of about 12,000 psi.

27. A method as set forth in claim 15 wherein said resin coating on said snd particles is cured to an extent that produces a Conductivity Ratio greater than that of the uncoated sand particles at closure stresses in excess of about 7000 psi.

28. A method as set forth in claim 15 wherein said mechanical shearing action is sufficient to limit agglomeration of the resin-coated sand particles to less than about 5% by weight.

* * * * *